United States Patent [19]

Fesko

[11] 4,374,170
[45] Feb. 15, 1983

[54] ROOM TEMPERATURE CURE POLYESTER LAMINATES

[75] Inventor: Donald G. Fesko, Allen Park, Mich.

[73] Assignee: Ford Motor Company, Dearborn, Mich.

[21] Appl. No.: 319,535

[22] Filed: Nov. 9, 1981

[51] Int. Cl.³ .............................................. D03D 3/00
[52] U.S. Cl. .................................... 428/224; 156/166; 156/169; 156/175; 156/310; 428/285; 428/288; 428/290; 428/392; 428/430; 525/939
[58] Field of Search ............... 428/105, 107, 224, 287, 428/288, 292, 378, 395, 290, 408, 285, 392, 430; 156/166, 169, 172, 173, 175, 308.8, 310; 525/DIG. 939

[56] References Cited

U.S. PATENT DOCUMENTS

| | | |
|---|---|---|
| 2,480,928 | 9/1949 | Hurdis . |
| 2,557,826 | 6/1951 | Keaton et al. ...................... 156/310 |
| 2,968,335 | 1/1961 | Monaco et al. ..................... 156/310 |
| 3,037,900 | 6/1962 | Hings et al. ........................ 156/310 |
| 3,390,037 | 6/1963 | Christie ............................... 156/310 |
| 3,725,501 | 4/1973 | Hilbelink et al. ................... 156/332 |
| 3,914,200 | 10/1975 | Oswitch et al. ..................... 156/332 |

OTHER PUBLICATIONS

Product Bulletin, Keton Peroxides, Lucidol Division, Pennwalt Corporation, Buffalo, New York.
Plastics Engineering, 26–29, Dec., 1976.

Primary Examiner—James J. Bell
Attorney, Agent, or Firm—Peter D. McDermott; Roger L. May

[57] ABSTRACT

A new composition of matter comprises the product of the amassment of two or more arrays of glass roving or other suitable filaments, each of which array has been coated or impregnated with one of two complementary resin systems, preferably thermosetting polyester resin systems. Each such complementary resin system comprises substantially the same or functionally similar resin and each further comprises a curing agent, for example, in the case of polyester resin an organic peroxide, which curing agent differs from the curing agent in the other resin system. The resin system of each array further comprises suitable accelerator which is substantially ineffective to promote the curing agent of the resin system in which it is incorporated, but which does effectively promote the curing agent of the other, complementary resin system. Upon amassment of the separate arrays the two accelerators act synergisticly in the combined resin system. Thus, the resulting novel composition of matter provides an extremely rapid cure resin system, wherein curing agent is dispersed substantially uniformly throughout the resin to be cured. The invention is applicable to filament winding techniques and the like to provide extremely rapid curing even at room temperatures and to provide products having improved physical properties.

Related aspects of the invention provide novel methods of preparing and novel methods of using the novel composition of matter.

50 Claims, No Drawings

ROOM TEMPERATURE CURE POLYESTER LAMINATES

INTRODUCTION

This invention relates to a novel composition of matter and methods of making same. More specifically, the invention relates to a novel composition of matter comprising the product of an amassment of two or more arrays of filaments, which arrays are impregnated with certain polyester resin coating materials. Related aspects of the invention relate to a process for making such novel composition of matter and to its use for manufacture of preforms of structural devices and to such preforms. The preforms are rapidly curable at room temperature to provide structural devices having mechanical properties significantly improved over those obtained using prior known techniques and materials.

BACKGROUND OF THE INVENTION

In the manufacture of devices of reinforced plastic, the use of resin impregnated filaments such as, for example, resin coated glass roving is well known, especially for use in laminating, molding and filament winding techniques. Filament winding typically involves coating or impregnating glass roving, yarn or the like with liquid resin and a suitable curing agent for the resin. The roving can be dipped into the liquid mixture, or otherwise brought into contact with it. The impregnated roving can then be wound, layer upon layer, onto a mandrel having suitable configuration to provide a preform of the desired product. The preform can then be cured by application of heat (and possibly pressure) over a period of time to yield the desired product. Use of resin impregnated filaments are likewise well known in molding and laminating applications, which also involve curing by application of heat (and possibly pressure) for a suitable length of time.

Numerous classes of resins suitable for use in such laminating, molding and filament winding techniques are known to the skilled of the art. These include, for example, epoxide resins, silicone resins, polysulfides, polyurethanes, and polyester resins. As referred to herein, polyester resin means unsaturated polyester resin which can be further polymerized, many of which are well known to the skilled of the art. Tetraethylene glycol dimethacrylate and like materials, in polymerizable form, are also taken to be within the scope of the term polyester resin. Unsaturated polyester resins often include, as a diluent, an unsaturated monomer such as, for example, styrene. It is well known in the art that unsaturated polyester resin cures or continues its polymerization reaction by a free-radical mechanism which is generally self-sustaining after initiation. Initiation of the curing reaction is accomplished by contacting the unsaturated polyester resin with a suitable initiator, often referred to as a curing agent. Well known curing agents suitable for polyester resins include certain organic peroxides such as, for example, benzoyl peroxide, methylethylketone peroxide, cumene hydroperoxide and dichlorobenzoyl peroxide.

As has been noted, the free-radical polymerization mechanism of the polyester resins is self-sustaining once initiated by the curing agent. Thus, curing does not strictly require uniform mixing of the curing agent with the polyester resin. The length of time needed for cure will be greater, however, where the curing agent is not uniformly dispersed throughout the resin and where, consequently, initiation of the polymerization reaction does not occur uniformly throughout the resin. This is especially so in view of the slow diffusion of the relatively large peroxide molecules of the curing agent through the resin. In addition, since the polymerization reaction proceeds faster at higher temperatures and is exothermic, non-uniform mixing of the curing agent into the resin can result in non-uniform curing, increased internal stress and consequently less desirable physical properties in the product.

Even where the curing agent is uniformly mixed into the polyester resin, curing is typically very slow at room temperature. Heating the resin accelerates curing. Thus, curing of thermosetting polyester resins is typically carried out at a temperature of from about 50°–175° C. Naturally, however, application of heat to achieve increased speed of curing is a significant disadvantage. Not only does the need for heat generation equipment and energy add substantial expense to the manufacturing process, but in addition, it necessarily limits production capacity to that of the ovens or other heat generating equipment. While compositions of resins and curing agents are known which are curable at room temperature, these typically require a substantially longer curing period, which itself adds considerable expense and limits production capacity.

Additional problems are involved in the use of heating in the manufacture of structural devices having large cross-sectional areas. Heating creates a temperature gradient through the pre-form, and since curing proceeds at a rate proportional to resin temperature, curing of the resin inside the pre-form is slow. That is, as a consequence of the temperature gradient, curing proceeds at a different rate throughout the pre-form. Non-uniform cure produces internal stresses in the cured product, which consequently, will have reduced material strength. Thus, for example, the skilled of the art would expect a leaf spring for an automotive vehicle suspension system, made by such conventional system to be unable to withstand normal use. While the normal curing process of thermosetting polyester resin is exothermic, the heat generated internally during cure typically is insufficient to cause curing to proceed sufficiently rapidly to overcome these adverse effects of the temperature gradient resulting from external heating during cure of a pre-form having a large cross-section. Heat transfer is poor through the uncured resin and, therefore, while external heat can be applied to accelerate curing, a temperature gradient across the pre-form cross-section will result.

Accordingly, it is known in the art to reduce curing time and/or heating requirements by admixing an accelerator with the resin and curing agent. Accelerators are known which are suitable for use with a given resin and curing agent. In the case of polyester resins, for example, known accelerators suitable for use in admixture with a diacyl peroxide curing agent include materials such as, for example, diethylaniline. Once an accelerator is incorporated into the polyester resin system, curing will proceed faster and/or at a lower temperature. While advantageous for the reasons already mentioned, this also presents serious disadvantages. In particular, such accelerated resin systems have greatly reduced pot life. In addition, the physical properties of a batch of resin will change constantly during use due to its constantly increasing degree of cure, i.e., polymerization at the time of use. Consequently, there results both waste of resin not timely used and diminished product quality. Attempts to avoid the problems of short pot life and changing resin properties have included the suggestion in U.S. Pat. No. 3,390,037 to Christie to prepare preimpregnated strands of fibers wherein yarn or glass roving or the like is coated only with thermosetting resin and then used in conjunction with yarn, glass roving, etc., coated only with the curing agent. It is suggested therein that the coated filaments can be stored separately for long periods before use. When the two coated filaments are combined for use, however, the curing agent is not dispersed throughout the resin. As noted above, problems associated with slow diffusion of the curing agent into the resin and non-uniform polymerization can result. Moreover, in this technique heating is required, since curing proceeds at a reasonable rate only if carried out at an elevated temperature.

Other attempts have been made to provide systems for forming rigid polyester reaction products in which components of the resin system are storable or have good pot life, yet react quickly upon contact. Invariably, the curing agent is segregated from the resin which, as discussed above, leads to inferior curing characteristics resulting from the slow and non-uniform dispersion of the curing agent into the resin upon contact. Of this genre, in addition to U.S. Pat. No. 3,390,037, is U.S. Pat. No. 3,037,900, directed to providing a viscous air tight seal on the surface of the thermosetting resin shown as being spray applied in two components. Curing agent is included with the resin in one component, but is segregated from the resin in the second component. In U.S. Pat. No. 2,968,335, curing agent is included with the resin in one of two spray-applied components, but is not included in the second component. Accelerator is included in the second component, but not in the first. Another approach is seen in U.S. Pat. No. 3,914,200 directed to the use of two component system. A polyester resin is used with an excessive amount of inhibitors and a peroxide curing agent in the first of two resin baths. The second bath is a certain mixture of accelerators effective to accelerate the curing agent. In use, the resin is contacted with the accelerators to overcome the inhibitor. The added expense and processing complications of the inhibitor obviously render this approach disadvantageous in many applications.

Directed to a different subject matter, i.e., adhesive systems, is U.S. Pat. No. 3,725,501 wherein the curing agent for each of two distinct resins (e.g., polysilicone and unsaturated polyester) is segregated therefrom by incorporation into the other resin. In use, the two components would be mixed and, again, the curing agent would be effective only as and when it migrated or diffused into the opposite resin. Another approach is seen in U.S. Pat. No. 2,557,826 wherein the two components of an adhesive each contain phenol-aldehyde resin miscible with the other, and each carries the catalyst for the other. This, of course, fails to address or resolve the problems outlined above particular to the use of the peroxide curing agents in polyester type resins.

It is the object of the present invention, therefore, to provide a novel method of making a structural device, laminate, coating or the like employing thermosetting resin impregnated filaments, wherein the thermosetting resins employed are stable at room temperature and yet provide a structural preform which cures very rapidly without external heating. Furthermore, it is an object of this invlention to provide such method wherein suitable curing agent is uniformly distributed throughout the resin with which the filaments which form the structural preform are impregnated. In addition, it is an object to provide compositions of matter and methods of employing same for manufacture of structural preforms having large cross-sectional areas to which external heat can be applied to accelerate curing while substantially avoiding non-uniform cure and the disadvantages thereof. Thus, it is an object of the invention to provide a method of making a product having significantly improved physical properties.

It is a related object of this invention to provide a new composition of matter which comprises an intermediate product of such novel method. More specifically, it is an object of the invention to provide impregnated filaments suitable for making a structural preform, laminate or like product wherein the resin system comprises thermosetting resin, curing agent dispersed uniformly throughout the resin and accelerator.

In addition, it is an object to provide a novel method of making such new composition of matter.

SUMMARY OF THE INVENTION

According to a method aspect of the present invention, the aforesaid objects and advantages of the invention are provided by a novel method of making a composition of matter suitable for a structural preform, laminate or the like, which method comprises amassing together:

(A) a first array of filaments impregnated with a first resin system comprising (a) thermosetting resin, (b) first curing agent for said resin and (c) first accelerator that is effective to promote a second curing agent for said resin and is substantially ineffective to promote said first curing agent; and (B) a second array of filaments impregnated with a second resin system comprising (d) said resin, (e) said second curing agent and (f) second accelerator that is effective to promote said first initiator and is substantially ineffective to promote said second initiator, wherein said amassment provides substantial contact, one array with the other.

According to the composition of matter aspect of the present invention, the aforesaid objects and advantages of the invention are provided by the novel composition of matter comprising the amassment of arrays of resin impregnated filaments (A) and (B), as described above, intermediate such amassment of the arrays and final cure of the thermosetting resin.

According to another aspect of the invention, a novel method of making a structural preform of a device, a laminate or the like (hereinafter, collectively, a "structural preform") comprises amassing arrays of resin impregnated filaments (A) and (B), as described above, and suitably forming or mounting the resulting amassment such as, for example, by winding the amassment in a multitude of layers on a mandrel having configuration suitable to form the desired structural preform. According to a related aspect of the invention there is provided a structural preform so formed.

It will easily be appreciated that prior to amassing these separate arrays (A) and (B) of resin impregnated filaments, the resin system of each comprises resin, curing agent and substantially ineffective accelerator and hence is extremely stable at room temperature. Each therefore provides excellent pot life. Upon amassing the separate arrays to provide substantial contact, one with the other, the substantially ineffective accelerator of each resin system is brought into contact with the other resin system and is effective to accelerate the curing agent of the other resin system. In fact, in preferred embodiments of the invention which are described below, the substantially ineffective accelerator of each resin system acts synergistically with the accelerator of the other resin system such that the curing agent of each resin system becomes, in effect, doubly-promoted. Since the combined resin system of the amassment comprises curing agent distributed substantially uniformly throughout the thermosetting resin and comprises accelerator effective for each of the curing agents, a structural preform comprising such resin system cures extremely rapidly even at room temperature. Signficant advantages are thus provided, including reduced manufacturing time, reduced heating requirements and, consequently, reduced costs. In addition, products so made, having cured more uniformly, are believed to have reduced internal stress and provide significantly improved physical properties. In fact, in view of the extremely fast cure provided by the present invention, even when external heat is applied to structural preforms having large cross-sectional areas, curing is substantially uniform and internal stress is minimized.

DETAILED DESCRIPTION OF THE INVENTION

According to the novel method of the present invention, two or more arrays of filaments are separately impregnated, each with one of two or more thermosetting resin systems. Each such resin system comprises the same polymerizable resin and/or other functionally equivalent resin. A functionally equivalent resin is any resin for which a curing agent of the first resin is substantially effective. While use of other suitable thermosetting resins is within the scope of the invention, for simplicity reference will be made herein to thermosetting polyester resin systems. Such polyester resins are preferred for the resin systems of the invention since (i) suitable curing agents are well known and readily commercially available, which when admixed with polyester resin absent accelerator, provide extended pot-life; and (ii) suitable accelerators are well known and readily commercially available which are substantially ineffective in conjunction with some curing agents and substantially effective in conjunction with others.

In addition to resin, each resin system also comprises suitable curing agent, which curing agent differs from that in the other resin system. In addition to resin and curing agent, each resin system also comprises suitable accelerator. With regard to such accelerator, it is a unique and significant aspect of the present invention that the accelerator in a given resin system be substantially ineffective to accelerate the action of the curing agent employed in that resin system. Consequently, the resin system can only cure approximately at the rate of the unaccelerated resin system and is therefore extremely stable at room temperature.

While it would follow that structural preforms, laminations, etc. formed of filaments such as, for example, glass roving impregnated with such effectively unaccelerated resin system would require high curing temperature and/or long curing periods, it is another unique and significant aspect of the present invention that the ineffective accelerator in each such resin system be an effective accelerator for the curing agent employed in the other resin system. That is, the accelerator employed in the first resin system must be substantially ineffective in conjunction with (i.e., does not promote) the curing agent employed in that resin system. That accelerator, however, is selected to be effective in conjunction with the different curing agent employed in the second resin system. Likewise, the accelerator employed in the second resin system is selected to be substantially ineffective in conjunction with the curing agent of that second resin system, but is effective in conjunction with the different curing agent selected for use in the first resin system. Thus, for example, a first polyester resin system can employ a diacyl peroxide curing agent and a suitable metal salt accelerator such as, for example, cobalt octanoate. Cobalt octanoate is substantially ineffective to promote diacyl peroxide curing agent for polyester resin and, therefore, would not be employed in conjunction therewith by the skilled of the art. A second polyester resin system can employ suitable ketone peroxide curing agent (which is effectively promoted by the aforesaid metal salt) and suitable tertiary amine accelerator such as, for example, N,N,-diethylamine, which accelerator is effective to promote the diacyl peroxide curing agent of the first resin system but is substantially ineffective to promote the ketone peroxide curing agent of the second resin system in which it is employed. As a result, each of the resin systems is substantially unaccelerated and so has an extended pot-life. Yet each is complementary of the other. That is, neither undergoes rapid, room temperature cure, but together they provide an essentially uniformly initiated, double accelerated, rapid room temperature cure resin system. Accordingly, upon amassing two or more arrays of filaments, each separately impregnated with one of such complementary resin systems, the resulting amassment comprises a doubly accelerated resin system and can be employed to make a structural preform which will cure substantially uniformly and extremely rapidly even at room temperature or with externally applied heat. As a result of uniform curing, the cured product will provide significantly improved physical characteristics.

Unsaturated polyester resins suitable for the present invention include those well known to the skilled of the art. While the preparation of polyester suitable for use in the complementary resin system of the present invention has been described in great detail in the prior art and forms no part of the present invention, per se, it may be mentioned here by way of illustration that suitable unsaturated polyester resins include, for example, isophthalic polyesters, maleic polyesters, orthophthalic polyesters, bisphenol A polyesters, vinyl esters and the like or a mixture of any of them.

The modifier with which the unsaturated polyester resin is mixed typically comprises a polymerizable monomeric compound such as, for example, styrene, side chain-substituted styrenes such as alpha methylstyrene, alpha ethylstyrene and the like or ring-substituted styrenes, such as ortho, meta and para-alkyl styrenes such as o-methylstyrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, dially tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate triallyl citrate, triallyl phosphate, trimethallyl phosphate, tetraallyl silane, tetraallyl silicate, hexaallyl disiloxane, and the like or suitable mixtures thereof.

The choice of suitable curing agent for each of the complementary resin systems will depent upon the resin(s) employed. Where thermosetting polyester resin and/or functionally equivalent resin is employed, a first curing agent preferrably comprises suitable aliphatic ketone peroxide having up to about 20 carbon atoms. Exemplary of such ketone peroxide curing agents are 2,4-pentanedione peroxide, methylethylketone peroxide, bis(1-hydroxycyclohexyl) peroxide, diacetone alcohol peroxide, cyclohexanone peroxide, and mixtures thereof. Preferred for use in methylethyl ketone peroxide in view of its low cost, commercial availability relative thermal stability and high catalytic activity in conjunction with suitable accelerator. Commercially avialable ketone peroxides which can be used alternately or in addition to those listed above include, for example, the Lupersol resins of organic peroxides such as DDM, DDM-30, DDA-30, Delta-X, DNF, DSW and 224 available from Lucidol Division of Penwalt Corp., Buffalo, N.Y. Other suitable ketone peroxides are disclosed in U.S. Pat. Nos. 3,330,871; 3,349,040; 3,149,126 and 3,377,409, the disclosure of each of which is incorporated herein.

The amount of curing agent employed in the resin system may vary appreciably, as known to the skilled of the art, depending on intended condition of use. Typically, the amount is from about 0.1% to 10% by weight based on the weight of the polymerizable composition. An amount of between about 0.5% and 3.% by weight of the polymerizable composition has been found to provide favorable cure rates. Higher amounts are useful, but may cause a significant degree of deterioration of the physical properties of the cured product.

For use in the second, complementary resin system, a second curing agent is selected for which there are accelerators which are substantially ineffective in conjunction with the ketone peroxide curing agent of the first resin system. Preferred for use as such second curing agent is one or more acyl, and more preferably diacyl peroxides (referred to collectively herein as acyl peroxides) of which many are known to the skilled of the art. Exemplary of such preferred curing agents include aromatic diacyl peroxides such as benzoyl peroxide which is most preferred, lauroyl peroxide, decanoyl peroxide, pelangonyl peroxide, acetyl peroxide, hydroxy acetyl peroxides such as 1-hydroxyethyl peroxyacetate (i.e., acetaldehyde monoperacetate), bis(2,4-dichlorobenzoyl) peroxide and di-(isononanoyl) peroxide. The acyl peroxide curing agents are employed in amounts as described for the ketone peroxide curing agents.

Suitable accelerator for each resin system is determined in view of the curing agent employed in the other, complementary resin system. Thus, where a first resin system employs a ketone peroxide curing agent and a second, complementary resin system employs an acyl peroxide curing agent, suitable accelerator for the first resin system according to the present invention can comprise a tertiary amine accelerator of which many are known to the skilled of the art. Suitable tertiary amine accelerators include, for example, those of the general formula:

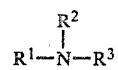

wherein $R^1$, $R^2$ and $R^3$ are each selected independently from $C_1$–$C_8$ alkyl, $C_7$–$C_9$ phenalkyl, phenyl, $C_1$–$C_8$ alkanol or mixtures thereof. Suitable aliphatic amine accelerators include those in which amino nitrogens have non-aromatic substitution, for example, ethyldiethanolamine. Suitable aromatic amine accelerators include those in which an amino nitrogen substitutes an aromatic ring, for example, an alkyl substituted aromatic amine such as N,N-dimethylaniline.

Among the tertiary monoamines suitable for use in the first resin system of the above described preferred pair of complementary resin systems, monoaryl-dialkyl tertiary amines have been found to be highly effective for acyl peroxide curing agents and substantially ineffective for ketone peroxide curing agents. Additional suitable amine accelerators are disclosed in U.S. Pat. No. 3,914,200 which disclosure is incorporated herein. Additional suitable amine accelerators include, for example, N,N-dimethyl-o-toluidine, N,N-dimethyl-p-toluidine and phenyldiethanolamine. These accelerators can be used either singly or in compatible combination with one another. Typically, accelerator is used in the amount of from about 0.05% to 0.5%, preferable 0.05% to 0.3%, by weight based on the weight of polyester resin. A greater amount of accelerator provides faster cure but increases significantly the cost of the resin system. If the resin is to be heated during cure, then the amount of accelerator can be reduced while retaining a high rate of cure.

In the second resin system of the above described preferred pair of complementary resin systems, suitable accelerator can comprise organic metal salt, wherein the metal preferably has two fascile valence states. Exemplary metal salt accelerators, of which many are known to the skilled of the art, include those of cobalt, vanadium, zirconium, iron, manganese, chromium, tin, aluminum, lead and copper. Of the foregoing, the transition metals are more preferred. The anion moiety is preferably a suitable $C_6$ to $C_{25}$ saturated or unsaturated, cyclic or acyclic carboxylic acid residue. Exemplary preferred metal salt accelerators include transition metal carboxylates such as cobalt heptanoate, cobalt octanoate and cobalt napthenoate. The usual range for such accelerator is from about 0.05% to 0.5%, preferably 0.05% to 0.3% by weight based on the total weight of a polyester resin. In a preferred embodiment, the polyester resin, curing agent and accelerator are present in the resin system in relative proportion of approximately 100:3:.3 parts by weight, respectively.

Suitable filaments include many well known to the skilled of the art such as, for example, carbon fibers, Kevlar (trademark, E.I. DuPont de Nemours and Co. Inc., Wilmington, Del.) fibers and glass roving, the last of which is preferred.

It will be obvious to the skilled of the art that the metal salt accelerator is substantially ineffective to accelerate the acyl peroxide curing agent with which it is admixed in the second resin system of the above described preferred pair of complementary resin systems. Likewise, it will be obvious that the amine accelerator of the first resin system is substantially ineffective for the ketone peroxide curing agent thereof. Each resin system is therefore highly stable at room temperature and thus provides excellent pot-life and consistent physical properties during a period of use. Neither, however, can provide a structural preform of filaments impregnated therewith, which would cure except at high temperature and/or over a prolonged curing period. Nevertheless, according to the present invention, an array of filaments impregnated with a first of these complementary resin systems can be amassed when and as needed with an array of filaments impregnated with the second resin system to provide, in toto, a resin system wherein substantially uniformly distributed peroxide curing agent is present throughout the resin system with an accelerator effective to promote the curing agent.

While not wishing to be bound by theory, it is believed that the explanation for the exceedingly rapid cure at room temperature and the more uniform nature of the cure lies in part in the diffusion of the accelerator of each resin system into the other, complementary resin system upon amassing the separately impregnated arrays of filaments. While, as discussed above, the large size of the peroxide curing agent molecules would inhibit rapid diffusion thereof into polyester resin, the same would not be true of the relatively small metal salt and amine accelerator molecules. These latter are believed to diffuse more rapidly into the complementary resin system and thereby provide the double acceleration, more uniform cure and other advantages of the present invention. Moreover, a synergistic effect is observed in that the rate of cure in the double accelerated amassed resin system of the invention is greater than that provided by a resin system comprising the curing agent of either complementary resin system together with the accelerator of the other. That is, the rate of cure of the resin system following amassment of the separate arrays of impregnated filaments is even greater than that which would be achieved using a single resin system comprising curing agent together with single accelerator known to be effective therewith. This is quite advantageous in view of the fact, consistent with the understanding of those skilled in the art, that the accelerator present in either of the complementary resin systems is alone substantially ineffective to promote the action of the curing agent employed therein. Yet the result is seen that upon amassment according to the invention, the resulting combined resin system is, in effect, double promoted and cures at a rate faster than is achieved with either corresponding single promoted resin system.

Furthermore, since curing of thermosetting polyester resin system is exothermic, the temperature of the curing resin will increase faster due to the high rate of cure provided by the double promoted resin system and hence accelerate yet further the rate of cure. In addition, the heat generated will accelerate decomposition of the peroxide curing agent, if any, to which diffusion of the accelerator does not occur. In net effect, the cure is both more homogeneous and more rapid and therefore provides both cost advantages and product having improved physical properties. These advantages are particularly beneficial in the manufacture by filament winding techniques of devices having large cross-sectional areas. The extremely fast diffusion of the accelerator into the complementary resin system upon amassment of the separate resin impregnated filamentary arrays provides substantially uniform cure and consequently prevents or reduces internal stress within the cured device. This has been found so, even in the case where external heat is applied to one or more surfaces of the preform during cure.

While the foregoing detailed description of the invention has been primarily directed to the preferred embodiment employing thermosetting polyester resin, it will be apparent to the skilled of the art, in view of this disclosure, to employ alternate suitable resins for which there are known pairs of curing agents for each of which there is at least one substantailly effective accelerator which is substantially ineffective for the other. The polyester resins described above are especially preferred, however, in view of the existence of at least a pair of well known, readily available curing agents, notably the ketone peroxide curing agents and the diacyl peroxide curing agents, for each of which there are well known, readily available, and highly effective accelerators which are substantially ineffective to promote the other. In addition, compatible materials other than those mentioned above, for example, fillers, pigments and others such as are known to the skilled of the art can be included in the resin system.

The operation and advantages of the invention will be further illustrated by, but is not intended to be limited to, the following examples. Unless otherwise indicated, parts are expressed in parts by weight and temperatures are stated in degrees centigrade. The benzoyl peroxide is used as a 50% by weight solution in styrene.

EXAMPLE I

Complementary resin systems according to the invention were prepared by mixing together the components listed below.

|  | Parts by Weight |
|---|---|
| Resin System A |  |
| Dion 6000 | 100. |
| Lupersol Delta-X | 3.0 |
| N,N—dimethylaniline | 0.3 |
| Resin System B |  |
| Dion 6000 | 100. |
| Benzoyl peroxide | 6.0 |
| Hex-Cem (12% cobalt) | 0.3 |

Dion 6000 is a trade designation of Koppers Co., Inc., Pittsburgh, Pennsylvania for a thermosetting polyester resin (viscosity 1600 cp at 25° C.). Lupersol Delta-X is a trade designation of Penwalt Corporation, Buffalo, N.Y. for a dimethyl phthalate solution of methylethylketone peroxide. Hex-Cem is a trade designation of Mooney Chemicals Inc., Cleveland, Ohio for cobalt octanoate. Each of the two resin systems was observed to be stable at a temperature of a 25° C. for a period of at least eight hours.

EXAMPLE II

Complementary resin systems according to the invention were prepared by mixing together the components listed below.

|  | Parts by Weight |
|---|---|
| Resin System A |  |
| Dion 6000 | 100. |
| Methylethylketone peroxide | 2.0 |
| N,N—dimethylaniline | 0.2 |
| Resin System B |  |
| Dion 6000 | 100. |

| | Parts by Weight |
|---|---|
| Benzoyl peroxide | 4.0 |
| Hex-Cem | 0.2 |

Each of the two resin systems was observed to be stable at a temperature of 25° C. for a period of at least eight hours.

EXAMPLE III

Equal portions of Resin System A and Resin System B of Example II were mixed together. A gel formed in about one minute.

EXAMPLE IV

The following example is directed to the manufacture of a leaf for a multi-leaf vehicular leaf spring. A mandrel was provided, around which resin impregnated glass roving could be wound to form the desired resin and glass preform. Heating means for the surface of the mandrel optionally provide an elevated temperature during the curing period. The mandrel surface had such configuration that three spring leafs were formed simultaneously around the surface thereof. (After cure of the resin pre-form, the individual leaf springs are cut at appropriate locations in the otherwise continous fiber reinforced cured plastic to produce the three spring leafs.) Each of two arrays of filaments consisted of 21 strands of type 30 glass, 10,000 filaments in each strand, available from Owens-Corning Fiberglass Corporation, Toledo, Ohio. At room temperature (21° C.), a first array was resin-impregnated by drawing same through a bath consisting of Resin System A of Example II. The second array was resin-impregnated by drawing it through a bath consisting of Resin System B of Example II. As the mandrel was rotated, each array of filaments was drawn through its corresponding resin bath at a rate of about 25 cm/sec. The two arrays were brought together before reaching the mandrel in such fashion as to provide intimate contact, one with the other. The amassed arrays were then wound simultaneously onto the mandrel at a rate of 25 cm/sec. The winding continued for a total of 15 revolutions, forming 15 layers of filaments. The resin forms a gel without 10 minutes of completion of the winding. The part is hard within 30 minutes except for the surface in contact with the unheated mandrel surface. The part can be removed after eight hours. At that time the continuous fiber reinforced plastic product was cut into three spring leafs for further processing. The part has a cross-section of approximately 2.3 cm at its thickest point. The fiber reinforced plastic of the product had about 3 parts by weight glass to 1 part resin.

EXAMPLE V

Complementary resin systems according to the invention were prepared by mixing together the components listed below.

| | Parts by Weight |
|---|---|
| Resin System A | |
| Selectron 50239 | 100. |
| Lupersol Delta-X | 3.0 |
| N,N—dimethylaniline | 0.3 |
| Resin System B | |
| Selectron 50239 | 100. |
| Benzoyl peroxide | 6. |
| Hex-Cem | 0.3 |

Selectron 50239 is a trademark designation of PPG Industries, Inc., Pittsburgh, Pennsylvania for a thermosetting polyester. Each of the two resin system was observed to be stable at a temperature of 25° C. for a period of at least about eight hours.

EXAMPLE VI

Complementary resin systems according to the invention were prepared by mixing together the components listed below.

| | Parts by Weight |
|---|---|
| Resin System A | |
| Dion 6000 | 100. |
| Methylethylketone peroxide | 2.0 |
| N,N—dimethylaniline | 0.7 |
| Resin System B | |
| Dion 6000 | 100. |
| Benzoyl peroxide | 4.0 |
| Hex-Cem | 0.7 |

Each of the two resin systems was observed to be stable at a temperature of 25° C. for a period of at least eight hours.

EXAMPLE VII

Equal portions of Resin System A and Resin System B of Example VI were mixed together. A gel forms in about one minute.

EXAMPLE VIII

The procedure of Example IV was followed to impregnate a first array of six rovings with Resin System A of Example VI and a second array of six rovings with Resin System B of Example VI. Sixty layers were wound on a mandrel. The pre-form is then cured in matched metal dies heated to 50° C. under pressure of 70 psi. The part is sufficiently cured to be removed within 15 minutes. The part has a cross-section of 11.5 sq. cm. at its thickest point. The fiber reinforced plastic of the product has about 3 parts by weight glass to 1 part resin.

EXAMPLE IX

The procedure of Example VIII is repeated except that the pre-form is cured in matched metal dies heated to 80° C. the part is sufficiently cured to be removed within 8 minutes.

It will be apparent to the skilled of the art, in view of the foregoing description of the invention, that modifications and substitutions are possible in the practice of the invention without departing from the spirit and scope thereof to. The extent that the foregoing description of the principles of the invention has been made with reference to specific apparatus, it is to be clearly understood that this is for illustration only and is not a limitation to the scope of the invention.

We claim:

1. A composition of matter comprising the product of an amassment of (A) a first array of filaments impregnated with a first resin system comprising (a) thermosetting resin, (b) first curing agent for said resin and (c) first accelerator that is effective to promote a second curing agent for said resin and is substantially ineffective to promote said first curing agent; and (B) a second array of filaments impregnated with a second resin system comprising (d) said resin, (e) said second curing agent and (f) second accelerator that is effective to promote said first curing agent and is substantially ineffective to promote said second curing agent;

wherein said amassment provides substantial contact, one array with the other.

2. The composition of matter according to claim 1 wherein said filaments comprise fiberglass roving.

3. The composition of matter according to claim 2 wherein said resin comprises polyester resin.

4. The composition of matter according to claim 3 wherein said first curing agent comprises ketone peroxide of 3 to 20 carbon atoms and said second curing agent comprises acyl peroxide of 2 to 20 carbon atoms.

5. The composition of matter according to claim 4 wherein said first curing agent comprises ketone peroxide selected from the group consisting of 2,4-pentanedione peroxide, methylethylketone peroxide, (1-hydroxycyclohexyl)peroxide, diacetone alcohol peroxide, cyclohexanone peroxide and mixtures thereof.

6. The composition of matter according to claim 4 wherein said second curing agent comprises acyl peroxide selected from the group consisting of benzoyl peroxide, acetyl peroxide, hydroxyacetyl peroxide, bis-(2,4-dichlorobenzoyl) peroxide, bis-p-chlorobenzoyl peroxide, di-(isononanoyl)peroxide and mixtures thereof.

7. The composition of matter according to claim 1 wherein said first accelerator comprises tertiary amine and said second accelerator comprises metal salt.

8. The composition of matter according to claim 7 wherein said first accelerator comprises tertiary amine selected from the group consisting of N,N-diethylaniline, phenyldiethanolamine, N,N-dimethyl toluidine and mixtures thereof.

9. The composition of matter according to claim 7 wherein said second accelerator comprises one or more metal salts, wherein the metal ion moiety of each is selected from cobalt, vanadium, zirconium, iron, manganese, chromium, tin, aluminum, lead, copper, and mixtures thereof, and the anion moiety of each is saturated or unsaturated, cyclic or acyclic carboxylic acid residue of from about 6 to 25 carbon atoms.

10. The composition of matter according to claim 9 wherein said metal ion moiety comprises transition metal ion.

11. The composition of matter according to claim 10 wherein said second accelerator comprises a metal salt selected from the group consisting of cobalt heptanoate, cobalt octanoate, cobalt napthenoate and mixtures thereof.

12. A composition of matter comprising the product of an amassment of (A) a first array of glass filaments impregnated with a first resin system comprising (a) thermosetting polyester resin, (b) first curing agent comprising methylethylketone peroxide, and (c) first accelerator comprising N,N-dimethylaniline; and (B) a second array of glass filaments impregnated with a second resin system comprising (d) thermosetting polyester resin, (e) second curing agent comprising benzoyl peroxide and (f) second accelerator comprising cobalt octanoate.

13. The composition of matter according to claim 12 wherein components (a), (b) and (c) are present in the first resin system and components (d), (e) and (f) are present in the second resin system, respectively, in relative proportions of approximately 100:3:.3 parts by weight, respectively.

14. A method of making a composition of matter which method comprises amassing (A) a first array of filaments impregnated with a first resin system comprising (a) thermosetting resin, (b) first curing agent for said resin and (c) first accelerator that is effective to promote a second curing agent for said resin and is substantially ineffective to promote said first curing agent; and (B) a second array of filaments impregnated with a second resin system comprising (d) said resin, (e) said second curing agent and (f) second accelerator that is effective to promote said first curing agent and is substantially ineffective to promote said second curing agent; and providing intimate contact, one array with the other.

15. The method of claim 14 wherein said filaments comprise fiberglass roving.

16. The method of claim 15 wherein said resin comprises polyester resin.

17. The method of claim 14 wherein said first curing agent comprises ketone peroxide of 3 to 20 carbon atoms, and said second curing agent comprises acyl peroxide of 2 to 20 carbon atoms.

18. The method of claim 17 wherein said first curing agent comprises ketone peroxide selected from the group consisting of 2,4-pentanedione peroxide, methylethylketone peroxide, (1-hydroxycyclohexyl)peroxide, diacetone alcohol peroxide, cyclohexanone peroxide and mixtures thereof.

19. The method of claim 17 wherein said second curing agent comprises acyl peroxide selected from the group consisting of benzoyl peroxide, acetyl peroxide, hydroxyacety peroxide, bis-(2,4-dichlorobenzoyl) peroxide, bis-p-chlorobenzoyl peroxide, di-(isononanoyl)-peroxide and mixtures thereof.

20. The method of claim 14 wherein said first accelerator comprises tertiary amine and said second accelerator comprises metal salt.

21. The method of claim 20 wherein said first accelerator comprises tertiary amine selected from N,N-diethylaniline, N,N-dimethyl toluidine, phenyldiethanolamine and mixtures thereof.

22. The method of claim 20 wherein said second accelerator comprises one or more metal salts, wherein the metal ion moiety of each is selected from cobalt, vanadium, zerconium, iron, manganese, chromium, tin, aluminum, lead, copper or a mixture thereof, and the anion moiety of each is saturated or unsaturated, cyclic or acyclic carboxylic acid residue of from about 6 to about 25 carbon atoms.

23. The method of claim 22 wherein said metal ion moiety comprises transition metal ion.

24. The method of claim 23 wherein said second accelerator comprises metal salt selected from the group consisting of cobalt heptanoate, cobalt octanoate, cobalt napthenoate and mixtures thereof.

25. The method of making a structural preform of thermosetting resin impregnated filaments, which method comprises amassing (A) a first array of glass filaments impregnated with a first resin system comprising (a) thermosetting polyester resin, (b) first curing agent comprising methylethylketone peroxide, and (c) first accelerator comprising N,N-dimethylaniline; and (B) a second array of glass filaments impregnated with a second resin system comprising (d) thermosetting polyester resin, (e) second curing agent comprising benzoyl peroxide and (f) second accelerator comprising cobalt octanoate.

26. The method according to claim 25 wherein components (a), (b) and (c) are present in the first resin system and components (d), (e) and (f) are present in the second resin system in relative proportions of approximately 100:3:.3 parts by weight, respectively.

27. A method of making a structural preform of thermosetting resin impregnated filaments, which method comprises amassing (A) a first array of filaments impregnated with a first resin system comprising (a) thermosetting resin, (b) first curing agent for said resin and (c) first accelerator that is effective to promote a second curing agent for said resin and is substantially ineffective to promote said first curing agent; and (B) a second array of filaments impregnated with a second resin system comprising (d) said resin, (e) said second curing agent and (f) second accelerator that is effective to promote said first curing agent and is substantially ineffective to promote said second curing agent;

wherein said amassment provides substantial contact, one array with the other, and winding said amassment in a multitude of layers on a mandrel having configuration suitable to form said structural preform.

28. The method of claim 27 wherein said filaments comprise fiberglass roving.

29. The method of claim 28 wherein said resin comprises polyester resin.

30. The method of claim 27 wherein said first curing agent comprises ketone peroxide of 3 to 20 carbon atoms, and said second curing agent comprises acyl peroxide of 2 to 20 carbon atoms.

31. The method of claim 30 wherein said first curing agent comprises ketone peroxide selected from the group consisting of 2,4-pentanedione peroxide, methylethylketone peroxide, (1-hydrocyclohexyl)peroxide, diacetone alcohol peroxide, cyclohexanone peroxide and mixtures thereof.

32. The method of claim 30 wherein said second curing agent comprises acyl peroxide selected from the group consisting of benzoyl peroxide, acetyl peroxide, hydroxyacetyl peroxide, bis-(2,4-dichlorobenzoyl)-peroxide, bis-p-chlorobenzoyl peroxide, di-(isononanoyl)peroxide and mixtures thereof.

33. The method of claim 27 wherein said first accelerator comprises tertiary amine and said second promoter comprises metal salt.

34. The method of claim 33 wherein said first accelerator comprises tertiary amine selected from N,N-dimethylaniline, N,N-dimethyl toluidine, phenyldiethanolamine and mixtures thereof.

35. The method of claim 33 wherein said second accelerator comprises one or more metal salts, wherein the metal ion moiety of each is selected from cobalt, vanadium, zirconium, iron, manganese, chromium, tin, aluminum, lead, copper, and mixtures thereof, and the anion moiety of each is saturated or unsaturated, cyclic or acyclic carboxylic acid residue of from about 6 to 25 carbon atoms.

36. The method of claim 35 wherein said metal ion moiety comprises transition metal ion.

37. The method of claim 36 wherein said second accelerator comprises metal salt selected from the group consisting of cobalt heptanoate, cobalt octanoate, cobalt napthenoate and mixtures thereof.

38. A perform made according to the method of any one of claims 27 to 37.

39. A composition of matter comprising a first resin system which first resin system comprises (a) thermosetting resin, (b) first curing agent for said resin and (c) first accelerator that is effective to promote a second curing agent suitable for said resin and is substantially ineffective to promote said first curing agent.

40. The composition of matter according to claim 39 wherein said resin comprises polyester resin.

41. The composition of matter according to claim 40 wherein said first curing agent comprises ketone peroxide of 3 to 20 carbon atoms.

42. The composition of matter according to claim 41 wherein said first curing agent comprises ketone peroxide selected from the group consisting of 2,4-pentanedione peroxide, methylethylketone peroxide, (1-hydroxycyclohexyl)peroxide, diacetone alcohol peroxide, cyclohexanone peroxide and mixtures thereof.

43. The composition of matter according to claim 41 wherein said first accelerator comprises tertiary amine.

44. The composition of matter according to claim 43 wherein said first accelerator comprises tertiary amine selected from N,N-diethylaniline, N,N-dimethyl toluidine, phenyldiethanolamine and mixtures thereof.

45. The composition of matter according to claim 40 wherein said first curing agent comprises acyl peroxide of 2 to 20 carbon atoms.

46. The composition of matter according to claim 45 wherein said first curing agent comprises acyl peroxide selected from the group consisting of benzoyl peroxide, acetyl peroxide, hydroxyacetyl peroxide, bis-(2,4-dichlorobenzoyl)peroxide, bis-p-chlorobenzoyl peroxide, di-(isononanoyl)peroxide and mixtures thereof.

47. The composition of matter according t claim 45 wherein said first accelerator comprises one or more metal salts wherein the metal ion moiety is selected from cobalt, vanadium, zirconium, iron, manganese, chromium, tin, aluminum, lead, copper, or a mixture thereof, and the anion moiety is saturated or unsaturated, cyclic or acyclic carboxylic acid residue of 6 to 25 carbon atoms.

48. The composition of matter according to claim 47 wherein said first accelerator comprises metal salt selected from the group consisting of cobalt heptanoate, cobalt octanoate, cobalt napthenoate and mixtures thereof.

49. The composition of matter comprising an array of filaments impregnated with the resin system of any of of claims 39 to 48.

50. The composition of matter according to claim 49 wherein said filaments comprise fiberglass roving.

* * * * *